United States Patent [19]
Kronenberg et al.

[11] Patent Number: 6,100,530
[45] Date of Patent: Aug. 8, 2000

[54] ANGULAR TIME SYNCHRONIZED DIRECTIONAL RADIATION SENSOR

[75] Inventors: Stanley Kronenberg, Skillman; George J. Brucker, West Long Branch, both of N.J.

[73] Assignee: The United States of America as represented by the Secretary of the Army, Washington, D.C.

[21] Appl. No.: 09/207,897

[22] Filed: Nov. 23, 1998

[51] Int. Cl.[7] ........................................ G01T 1/18
[52] U.S. Cl. ................ 250/361 R; 250/359; 250/360.1; 250/458.1; 250/267; 250/367
[58] Field of Search ............................. 250/361 R, 360.1, 250/389, 458.1, 267, 367

[56] References Cited

U.S. PATENT DOCUMENTS

| | | |
|---|---|---|
| 5,345,084 | 9/1994 | Byrd . |
| 5,557,107 | 9/1996 | Carcreff et al. ...................... 250/361 R |
| 5,665,970 | 9/1997 | Kronenberg et al. . |

OTHER PUBLICATIONS

Chubb et al., "A Direction Neutron Detector for Space Research Use", IEEE Transactions on Nuclear Science NS–13, pp. 468–477, Feb. 1966.

Stetson et al., "A Directional Scintillation Counter for Neutrons", 6 Nuclear Instruments and Methods, pp. 94–95, 1960.

Kronenberg et al., "Directional detector for arrays of gamma ray and X–ray sources", Nuclear Instruments & Methods in Physics Research, Section A, pp. 531–540, (1996).

Kronenberg et al., "Locating and imaging sources of gamma and X–radiation directly or through thick shields", Nuclear Instruments & Methods in Physics Research, Section A, pp. 401–409, (1997).

Kronenberg et al., "High angular resolution sensing of gamma rays in space", International Society for Photo–Optical Instrumentation Engineers Journal, vol. 3116, pp. 49–56, Jul. 1997.

*Primary Examiner*—Constantine Hannaher
*Assistant Examiner*—Andrew Isad
*Attorney, Agent, or Firm*—Michael Zelenka; George B. Tereschuk

[57] ABSTRACT

An angular time-synchronized directional radiation sensor is provided to indicate the direction, or distribution of directions, of incident gamma radiation, and consequently, to locate sources of radioactivity emitting these photons. The angular time-synchronized directional radiation sensor comprises a rotating radiation sensing means, interacting with the incident radiation to produce light flashes, together with a stationary photomultiplier tube that converts the light flashes to electrical pulses that are counted by a data collection means. A synchronous motor enables the radiation sensing means to complete a 360° scan within 1 second to reduce the time needed for measuring from hours to only a few minutes. The data collection means calculates an angle of rotation at a corresponding fraction of the 360° scan to rapidly indicate the direction of a radiation source. In one embodiment, the data collection means is a computer. The radiation sensing means can be a scintillator assembly.

34 Claims, 7 Drawing Sheets

FIG. 10

ANGULAR TIME SYNCHRONIZED DIRECTIONAL RADIATION SENSOR

GOVERNMENT INTEREST

The invention described herein may be manufactured, used, sold, imported, and/or licensed by or for the Government of the United States of America without the payment to us of any royalties thereon.

FIELD OF INTEREST

This invention relates to radiation sensors and, more particularly, to directional radiation sensors which indicate the direction of incident gamma radiation sources by angle and distance, and consequently, to locate sources of radioactivity that are emitting these photons, with increased sensitivity and decreased measurement time.

BACKGROUND OF THE INVENTION

It is often desirable to determine the direction of a radiation source, e.g., gamma radiation, fast neutrons, and so on such as in tomography, astronomy, and civil defense applications. However, because most forms of radiation interact with matter through the processes of the photoelectric effect, Compton scattering and pair production, it has been difficult to accurately detect and locate the radiation source.

One approach is the collimated instrument with shielding that restricts angular acceptance of radiation and reduces background contributions from other directions, so that maximum output is obtained only when an aperture in the shielding is aligned with a radiation source. The disadvantages of collimated instruments include distortion of incoming radiation by interactions with the collimator walls, a small solid angle of acceptance when a high directional resolution is necessary thus reducing radiation intensity, and poor angular resolution when a large solid angle of acceptance is necessary.

Other approaches include the filament-type detector that obtains directional information by aligning filament axes toward the radiation source to provide a directional output. This approach is described in Chupp et al., "A Direction Neutron Detector for Space Research Use," IEEE Transactions on Nuclear Science NS-13, pp. 468–477, February 1966. The filament array approach uses forward-peaked angular distribution of protons from n-p collisions to obtain directional effects, as described in Stetson et al., "A Directional Scintillation Counter for Neutrons," 6 Nuclear Instruments and Methods, pp. 94–95, 1960.

Often, weight and portability are important considerations in selecting a sensor. For example, space applications require lightweight devices, and simplicity is desired since repair is not feasible. These same considerations are also applicable to mobile detectors, particularly hand-held devices or those requiring access to restricted locations.

Another approach is the fast neutron directional detector described in Byrd et. al, U.S. Pat. No. 5,345,084, entitled, "Directional Fast-Neutron Detector," issued Sep. 6, 1994, in which several omnidirectional fast neutron radiation detectors are closely packed to form a segmented symmetric detector and a processor arithmetically combines the incident radiation counts from the detectors to output a signal functionally related to a direction of a source for radiation. Output radiation counts are combined by subtracting counts from the detectors having front-back symmetry and subtracting counts from the detectors having left right symmetry. Using this approach, the resulting differences form a vector quantity indicating radiation source direction, but this detector is limited to detecting the direction of fast neutrons and has a low directional resolution.

The long-felt need for a directional detector or sensors of radiation sources with a high angle of acceptance and high resolution for detecting different types or intensities of radiation sources was met with Kronenberg et. al, U.S. Pat. No. 5,665,970 entitled, "Directional Radiation Detector and Imager." Although those devices provide much improved accuracy, a scan-time of an hour or more for independent measurements was still required after positioning the device at several varying angles. This limitation of measurement time could inhibit practical, real-time field use, or other intense or dangerous circumstances.

The present invention addresses and overcomes these sensitivity and time of measurement drawbacks, shortcomings and limitations with a rotatable scintillator assembly which provides a faster and more sensitive radiation sensor device than any of the prior art devices and techniques. This invention's scintillation-type radiation sensor provides a much-improved sensitivity below background levels, rather than merely at background levels, within a few minutes rather than the hours previously required. This much-improved, rapid sensitivity is made possible by a rotatable scintillation unit, interacting with the measured radiation to produce light flashes, together with a stationary photomultiplier tube that converts the light flashes to electrical pulses and instrumentation for counting pulses within the photomultiplier unit. In one embodiment of the present invention, the instrumentation is connected to a processor to afford even greater portability for field use.

In addition to the above-cited Kronenberg et al., U.S. Pat. No. 5,665,970 "Directional Radiation Detector and Imager," issued to the present inventors on Sep. 9, 1997, which is incorporated herein by reference, the following publications also illustrate prior art devices:

S. Kronenberg, et al. "Directional Detector For Arrays Of Gamma Ray and k-ray Sources," Nuclear Instruments and Methods in Physics Research, Section A, 378, pp. 531–540, 1996;

S. Kronenberg et al. "Locating and Imaging Sources of Gamma and X-radiation Directly or Through Thick Shields," Nuclear Instruments and Methods in Physics Research, Section A, 387, pp. 401–409, (1997); and S. Kronenberg et al. "High Angular Resolution Sensing Of Gamma Rays In Space," International Society for Photo-Optical Instrumentation Engineers Journal, 3116, pp. 49–56, July 1997.

SUMMARY OF THE INVENTION

Accordingly, one object of the present invention is to provide an angular time-synchronized directional radiation sensor for radiation sources below background levels.

Another object of the present invention is to provide an angular time-synchronized directional scintillation radiation sensor for radiation sources below background levels in a few minutes.

Still another object of the present invention is to provide an angular time-synchronized directional radiation sensor to quickly detect radiation intensities substantially below background radiation by rotating a means for radiation sensing with a stationary photomultiplier tube to convert light flashes to electrical pulses with computerized instrumentation for calculating directional angles based on counted pulses.

These and other objects are accomplished by the present invention to indicate the direction, or distribution of directions, of incident gamma radiation, and consequently, to locate sources of radioactivity emitting these photons. The angular time-synchronized directional radiation sensor comprises a rotating radiation sensing means, interacting with the incident radiation to produce light flashes, together with a stationary photomultiplier tube that converts the light flashes to electrical pulses and instrumentation for counting pulses within the photomultiplier unit. The radiation sensing means can be a scintillator assembly. The instrumentation can be connected to a data processor.

In prior art devices, the scintillation assembly is not fixedly mounted onto a photomultiplier tube rotates while the photomultiplier tube remains stationary. This invention provides a rotatable radiation sensing means at a high speed of about 60 rpm, so that the radiation sensing means scans through 360° in one second. The synchronization of the radiation sensing means' angle of rotation with time as a multi-channel scalar sorts counts, or events, into channels as a function of time also reduces the time needed for measuring necessary data from hours to only a few minutes. The preferred embodiment of the present invention employs a data processor for computerized data collection allowing even more portable field use.

Other detection means beside the scintillator assembly can be combined with a photomultiplier tube and be employed in accordance with the present invention. Such other suitable radiation detection systems or radiation sensing means include a stack of adequate solid state detectors, suitable Geiger Mueller counters, ion chambers and so forth.

The principles of operation and design of directional sensors are well known to those skilled in the art. A planar detector, e.g. a layer of scintillator, which is thin compared with the applicable ranges of photo-Compton and pair electrons is sandwiched between plates of low and high Z (atomic number) materials. For quantum energies of gamma rays greater than 0.6 MeV, the number of electrons emitted from the surfaces of the two layers into the detector is greater when the gamma's enter through the low Z-layer than when entering through the high Z-layer. For lower quantum energies, the emission effect is reversed, but now the incident gamma rays are attenuated more by the high Z-layer than the low Z-layer. Thus, the signal is again greater when the gamma rays enter through the low Z-materials compared to the signal when the gamma rays enter through the high Z-layer. The worst case energy is about 0.6 MeV, which is close to the 0.662 MeV gamma rays from Cs. Thus, if the sensor works for a cesium source then it will work for all other quantum energies.

Such prior art sensors, based on several detection systems, produce response functions looking like step functions when the detectors were rotated in the fields of gamma ray or x-ray photons generated by point sources. Experiments conducted with those sensors demonstrated that they have a $4\pi$ solid angle of acceptance and that arrays of discrete point sources of cesium, cobalt, and x-rays can be detected and located accurately by angle and distance. The measurements showed that sources of photon energies from 14 KeV to 1.25 MeV could be located by their polar and azimuthal angles to within one second of arc, the accuracy of which was only limited by the ability to measure very small differences in angles. This principle also applies to gamma quantum energies up to 1,000 MeV based on computer simulations conducted by the present inventors.

Prior art detectors can distinguish the primary photons from photons which have interacted on their way from the source to the detector because all interactions result in the change of the photon's direction. S. Kronenberg et. al, "Sensors for Locating and Imaging Sources of Gamma and X-radiation either Directly or Through Thick Shields," cited above, demonstrated in previous experiments that the direction of a point source, the spot on the anode of a 300 KV x-ray machine, could be determined through a 46 cm thick Barytes concrete wall. In that experiment, the x-rays exiting but of the wall were mainly forward scattered x-rays mixed with some of the primary bremsstrahlung photons.

The present inventors have shown analytically that the angular distribution of radiation incident on the sensor is proportional to the first derivative of the scan data, that is, event count rate versus orientation of the detector. The above relationship holds true except for cases where an abrupt change of the signal occurs at an angle close to parallel incidence to the detector plane. This is the case whether the radiation field is a point source or is a step function. In these cases, the radiation travels a long path through the high Z plate or through the low Z plate, resulting in a considerable absorption of the incident radiation. This causes an undershoot or an overshoot and acts as a precursor of the coming transition response at the angular location of the radiation source, as described herein and in the experimental results found in S. Kronenberg, et. al, "Directional Detector For Arrays Of Gamma Ray and X-ray Sources," as well as S. Kronenberg et. al, "Locating and Imaging Sources of Gamma and X-radiation Directly or Through Thick Shields," both cited above. By advantageously combining the rotatable radiation sensing means and a stationary photomultiplier tube with electronic instrumentation, highly desirable and rapid capabilities of sensitivity well below background levels are provided. These capabilities were heretofore unattainable in prior art devices and techniques when the scintillation assembly was fixed in place on the photomultiplier tube, and are now provided without suffering from any of the disadvantages, shortcomings and limitations of those prior art devices.

BRIEF DESCRIPTION OF THE DRAWINGS

These and other objects and advantages of the present invention will become readily apparent in light of the Detailed Description of the Invention and the attached drawings wherein.

DETAILED DESCRIPTION OF THE INVENTION

Figure 1:
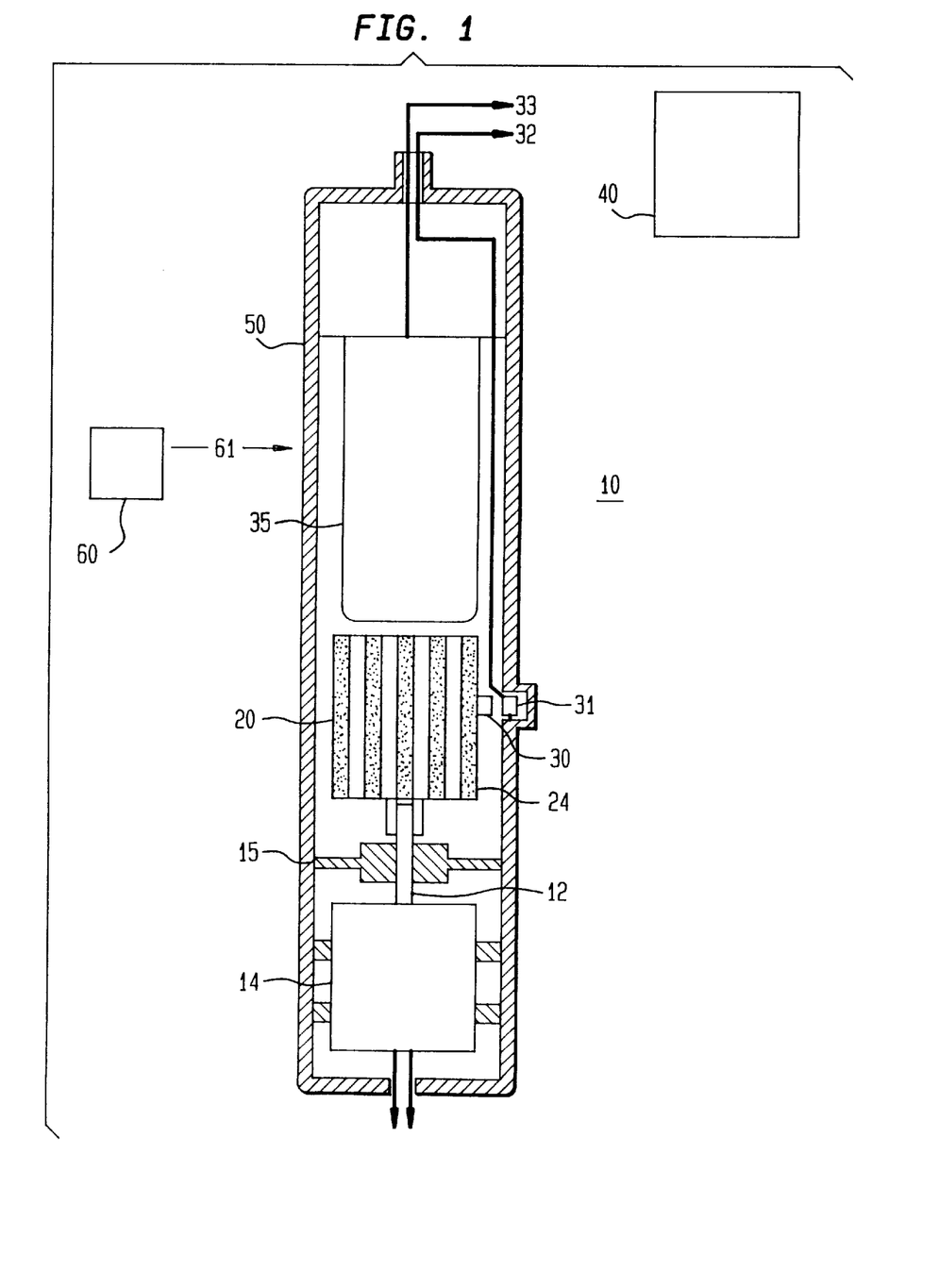
FIG. 1 is a conceptual cross sectional view of one embodiment of the angular time synchronized directional radiation sensor of the present invention.

Now referring to the drawings, FIG. 1 depicts a conceptual cross sectional view of one embodiment of an angular time-synchronized directional sensor of the present invention. Sensor 10 is built with three main components: a means for radiation sensing 20, such as a scintillator counter, that interacts with incident radiation to produce light flashes that a photomultiplier tube ("PMT") 35 converts to electrical pulses which are counted by a means for data collection 40. Said radiation sensing means 20 is rotatably mounted within a light-tight housing 50.

Figure 2:
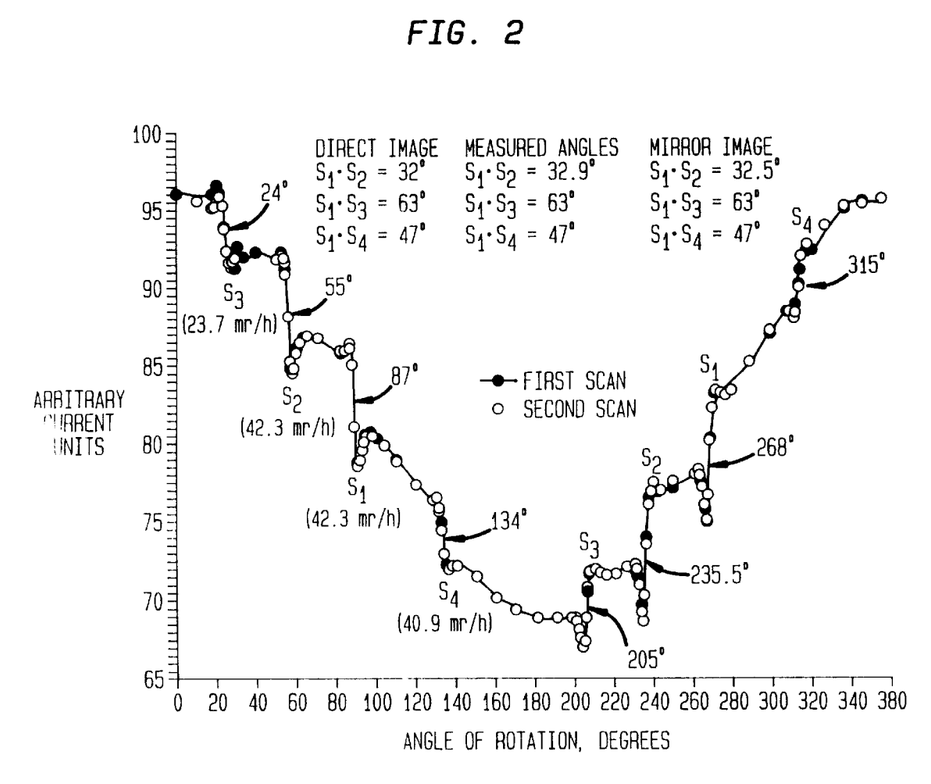
FIG. 2 is a graph depicting scintillation counter sensor output current when scanning for independent point sources of radiation against angle of rotation.

FIG. 2 is a graph depicting a typical scintillation counter sensor output current against angle of rotation of four radiation sources.

Figure 3:
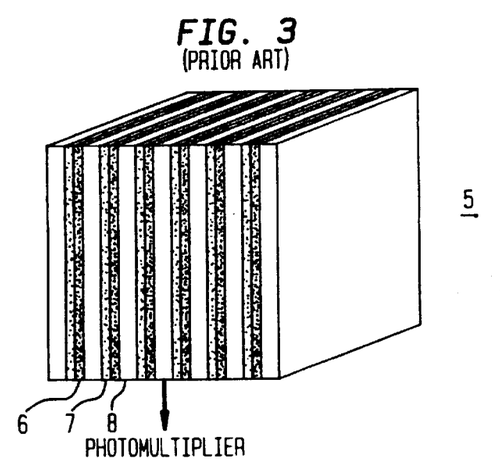
FIG. 3 is a perspective view of a scintillation assembly having 12 sandwiches of lead, plastic scintillator NE 102 and Lucite™ used in prior art directional radiation detectors.

FIG. 3 is a perspective view of prior art scintillation assembly 5 having 12 sandwiches of lead 6, plastic scintillator NE 102 8 and Lucite™ 8 used in prior art directional radiation detectors. In this drawing, the lead layer 6 is 0.13 mm thick, the scintillator layer 7 is 0.25 mm thick and the Lucite™ layer 8 is 1.75 mm thick.

Figure 4:
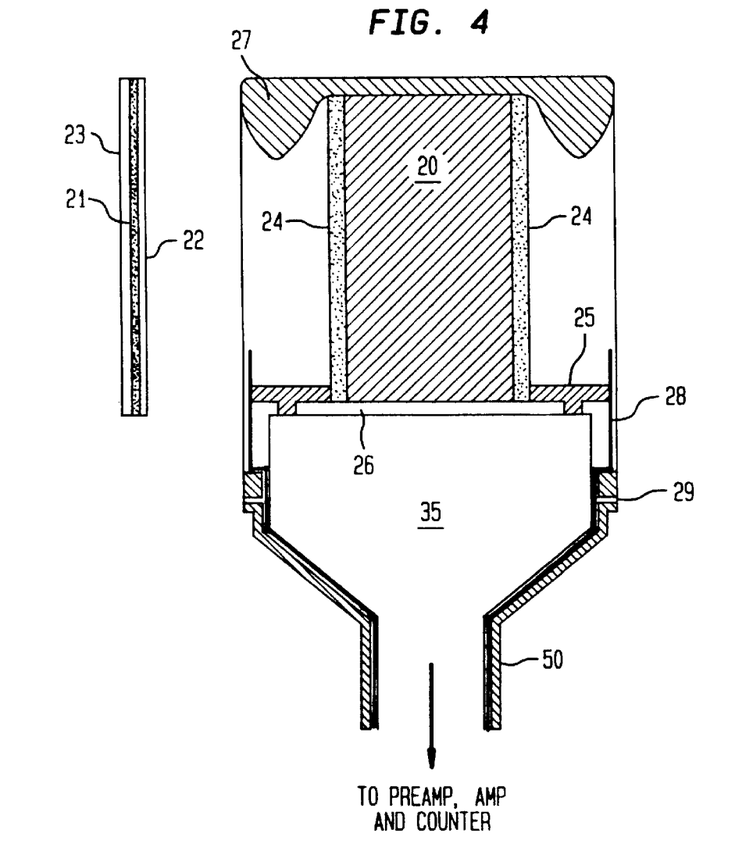
FIG. 4 is an exploded cross-sectional view of the radiation sensing means coupled to a photomultiplier tube and an air gap used in all embodiments of the present invention.

Referring now to FIG. 4, there is depicted an enlarged cross sectional and more detailed view of said radiation sensing means 20 and said PMT 35, which are inverted in FIG. 4, within said housing 50. Said radiation sensing means 20 is composed of numerous flat layers, each layer comprising a scintillator layer 21 sandwiched between a foil layer 22 and a Lucite layer 23. Said PMT 35, said radiation sensing means 20, and a motor 14, not shown here, are disposed in said light-tight housing 50. Also depicted is a Lucite™ outer layer 24, centering support 25, an air-gap 26, a foam rubber cushion 27 impinging against said radiation sensing means 20, which when compressed acts as a spring. A $\mu$ metal shield 28 extending to the base of said PMT tube 35 and a light-tight gasket 29 are also depicted in FIG. 4. Said air-gap 26 separates the rotating radiation sensing means 20 from the PMT 35. The dimensions and other aspects of the FIG. 4 radiation sensing means will be described in further detail below in connection with experiments performed by the present inventors. Said radiation-sensing means 20 can be composed of different combinations and numbers of layers, with different dimensions. The radiation sensing means 20 can also be a scintillator.

Referring back to FIG. 1, said motor is 14 shielded by light shield 15 to prevent light, such as motor sparks, from reaching the PMT 35. A means for transmitting signals 30 is disposed on said outer layer 24 of the radiation sensing means 20. A means for receiving signals 31, having a timer, is disposed within said housing 50 in proximity to that portion of said outer layer 24 where said transmitting means 30 is located.

In operation, said radiation sensing means 20 rotates and interacts with emitting incident radiation, indicated by arrow 61, from a radiation source 60 to produce light flashes. A shaft 12 projecting through said shield 15 connects said radiation sensing means 20 and said synchronous motor 14. Said motor 14 causes said radiation sensing means 20 to rotate within said housing 50 so that a 360° scan is completed within 1 second. Said PMT 35 converts the light flashes from said radiation sensing means 20 into electrical pulses and provides a PMT output 33 to said data collection means 40. During each rotation of said radiation sensing means 20, said transmitting means 30, passing said stationary receiving means 31 within said housing 50, transmits a signal for each electrical pulse to said receiving means 31 to reset the timer. This causes the receiving means 31 to record when each light flash was emitted. The timed electrical pulses form a receiver output, indicated by arrow 32, which are then ultimately counted by said data collection means 40, thereby permitting the rapid measurements provided by the present invention at a much-increased level of accuracy.

Whenever said transmitting means 30 passes and signals said receiving means 31, the timer is reset after each rotation. When an incident gamma ray produces a light flash in the radiation sensing means 20, the sensor 10 of the present invention records the time, and thus the angle, at which the event occurred. Thus the time measured at any point during each rotation is proportional to the angle at the corresponding fraction of 360°. For example, an electronic stopwatch with a one microsecond time resolution will resolve the angle to 0.006°, i.e., 0.36 minutes of arc, when said radiation sensing means 20 rotates at 60 rpm.

By advantageous synchronization of the angle of rotation of said radiation sensing means 20 with time as the sensor 10 accumulates counts, or events, the time needed to acquire the necessary data is reduced from several hours in the prior art devices to only a few minutes. The sensor 10 is turned on and exposed to the radiation source 60 for a time necessary to accumulate a statistically valid number of counts. The sensor 10 provides said data collection means 40 with said receiver output 32 and said PMT output 33.

A number of variations of this embodiment are also considered within the contemplation of the present invention. Said radiation sensing means 20 could be a scintillation assembly, or another suitable radiation detection systems such as a stack of adequate solid state detectors, a suitable Geiger Mueller counter, an ion chamber and so forth. Said data collection means 40 could be a computer programmed with the appropriate software. Said transmitting means 30 could be a small magnet with a coil acting as said receiving means 31. Said transmitting means 30 could also be an infrared LED device with an infrared sensor acting as said receiving means 31. The timer of said receiving means 31 could be any electronic timing device and could even be activated by a mechanical trigger means such as a trip-wire within said housing 50.

Referring back to FIG. 4, an experimental angular time-synchronization directional sensor built in accordance with the present invention is depicted. The sensor provided a much-increased sensitivity. The scintillation assembly used as the radiation sensing means 20 for the experiment measured 8 cm×8 cm and is 12.7 cm high, comprising 40 sets of flat layers. Each set of layers comprised a 0.254 mm thick layer of plastic scintillator 21, made of Rexon, RP 102A, sandwiched between a 0.127 mm thick lead foil layer 22 and a 1.6 mm thick Lucite™ layer 23. To establish electron equilibrium, the outer layer 24 of the scintillator assembly was composed of 3.2 mm thick Lucite™ slabs. This assembly was positioned on a 5 inch diameter PMT 35 that together with the assembly is housed in a 17.8 cm high, 15.25 cm diameter steel housing 50 with 0.27 mm wall thickness. Those skilled in the art will readily recognize that numerous other and different combinations of materials, stacking arrangements and numbers of layers, with different dimensions, are also within the contemplation of the present invention.

One unexpected effect was observed in the operation of the sensor 10. The scintillator layers themselves guided the light produced by the radiation to the surface of the PMT 35 via an effect analogous to the fiber optics principle, which significantly increased the sensor's efficiency. With the amplifier gain, discriminator level, PMT voltage, and shaping time constant of the amplifier optimized, the observed counting sensitivity was 6 counts per incident Cs photon per cm$^2$ for normal incidence on the Lucite™ side of the scintillator.

An experiment to test the capabilities of this sensor 10 used a laboratory setup containing three small Cs sources, with the results depicted in FIGS. 5 through 8. The distances of sources from the sensor 10 were 697.9 cm for $S_1$, 488.8 cm for $S_2$, and 447.7 cm for $S_3$. The room also contained other sources that were well shielded in their lead containers. Nevertheless, the presence of these sources increased the background level from 17 $\mu$ rad/h in the office area, which is the same as in central New Jersey at ground level, to 24 $\mu$ Gray/h in the experimental region. The intensities from the three Cs sources at the sensor location were from $S_1$, 13 photons/cm$^2$- s; from $S_2$, 15 photons/cm$^2$- s, and from $S_3$, 32 photons/ cm$^2$- s. The sensor 10 was rotated, stopping at each degree and events generated in the scintillator assembly by all three sources were counted for a period of 1.5 minutes. Two scans were made of the three sources. For one of the scans the axis of the sensor was tilted at an angle of 45° to the vertical and the other was made with the sensor's axis aligned at 90° from its initial position. Thus, two orthogonal scans were made of the radiation sources, yielding the polar and azimuthal angles for the positions of the three sources.

Figure 5:
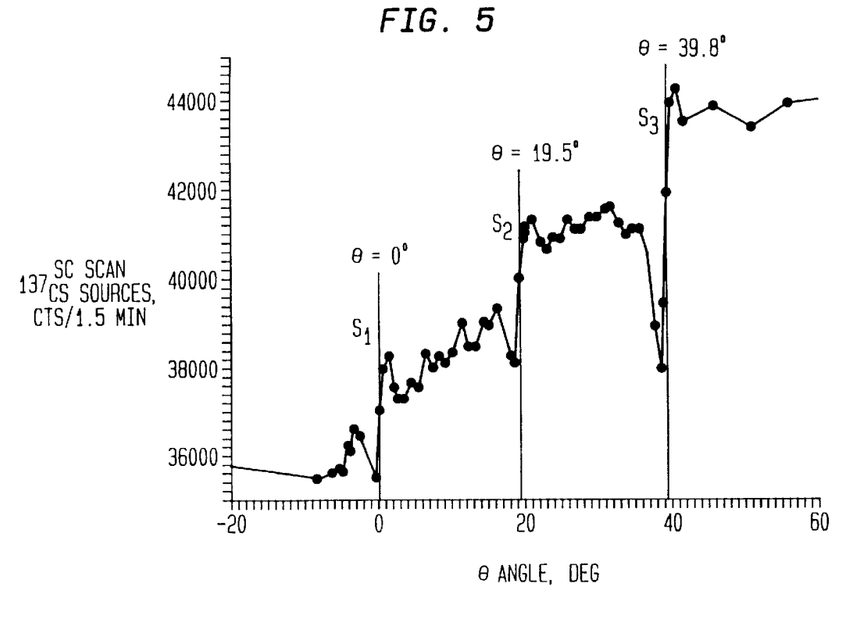
FIG. 5 is a graph depicting a scintillation counter sensor scan of three $^{137}$Cs sources versus a theta angle of rotation.
Figure 6:
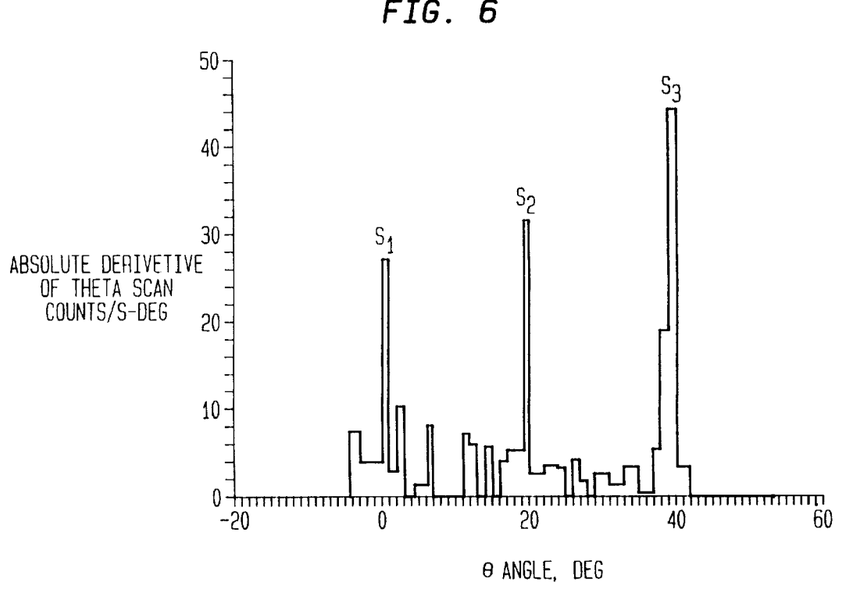
FIG. 6 is a graph depicting an absolute derivative of the FIG. 5 scintillation counter sensor scan.
Figure 7:
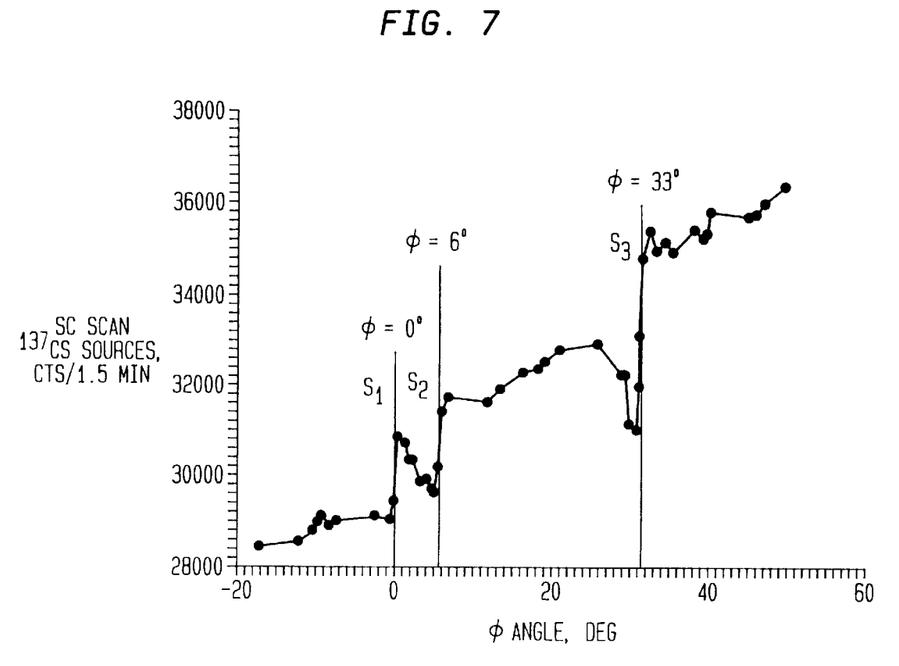
FIG. 7 is a graph depicting a scintillation counter sensor scan of three $^{137}$Cs sources against a phi angle.
Figure 8:
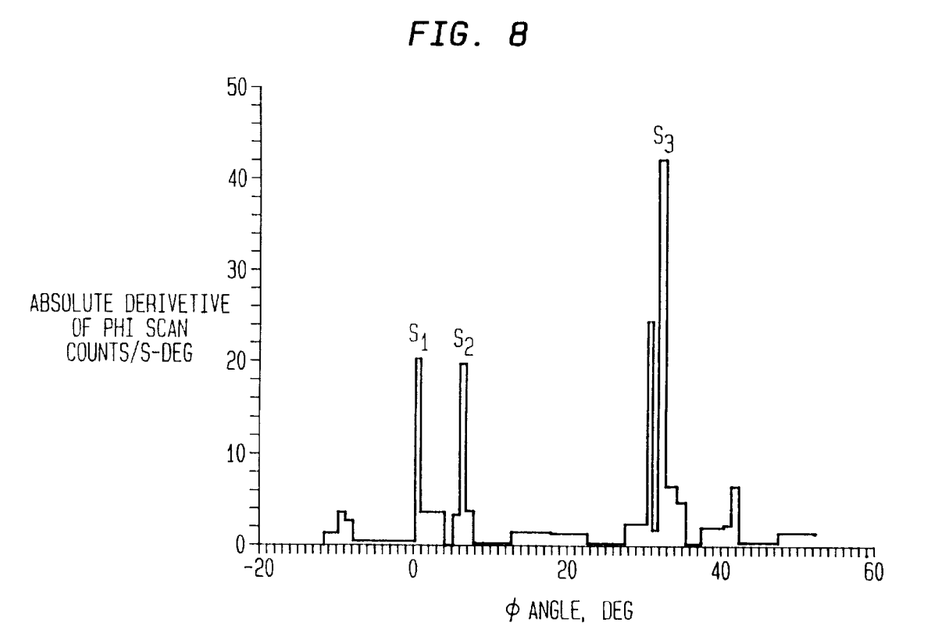
FIG. 8 is a graph depicting an absolute derivative of the FIG. 7 scintillation counter sensor scan.

Referring now to FIG. 5, scan results are shown where the counts per 1.5 minutes versus the arbitrary theta angle of rotation are plotted. FIG. 6 contains the derivatives, in counts/s-deg, or slopes of the scan data in FIG. 5 that are displayed as a function of the angle. Similar data for the second, orthogonal scan and its derivative are shown in FIGS. 7 and 8.

It was found that by arbitrarily setting the experimental scan angle of $S_1$ equal to zero degrees in FIG. 5, the positions of the other sources relative to $S_1$ become $\theta$ ($S_2 \rightarrow S_1$)=19.5° and $\theta$ ($S_3 \rightarrow S_1$)=39.8°. The same approach was applied to the phi scan, which is displayed in FIG. 7. In FIG. 7, the relative source positions were $\Phi(S_2 \rightarrow S_1)$=6° and $\Phi(S_3 \rightarrow S_1)$=33°. The angle values were obtained from the derivative plots in FIGS. 6 and 8 and were checked by line-of-sight measurements from the sensor 10 to the sources. The measured relative positions were found to be the same as the experimental values that were obtained from the radiation measurements within the accuracy limits for the laboratory equipment used.

The sharp transition regions, positive slopes and derivatives, corresponding to the locations of the three sources are easily identified in the FIG. 5 scan plot. In addition to these dominating sources, it can be seen that some of the background sources in their lead containers still generate small and less prominent transitions. For example, the smaller transitions of about −5°, those between the locations of $S_1$ and $S_2$, and also between $S_2$ and $S_3$.

In operation, the negative-going precursors that occur just prior to the transition regions take place as the photons enter parallel to the lead layers and are heavily absorbed. As the angle increases, the photons hit the Lucite™ layers and the electron emissions increase sharply, thus producing the positive slopes of the transitions. Similar signatures can be seen in the phi angle scans in FIG. 7.

FIG. 6 shows the derivative of the FIG. 5 scan data. The mean angles of the derivative maxima represent the locations of the sources and the corresponding amplitudes, the intensities of the sources. It can be seen that the amplitudes of the maxima are proportional to the source intensities, of 13, 15, and 32 photons/cm$^2$- s for sources $S_1$, $S_2$, and $S_3$, respectively. The derivative peak ratios are $S_2/S_1$=1.2, $S_3/S_1$=1.6 and $S_3/S_2$=1.4 whereas the actual intensity ratios are 1.2, 2.5, and 2.1, respectively.

FIG. 8 shows the derivatives of the phi scan. In this case, the experimental peak ratios are $S_2/S_1$=0.97, $S_3/S_1$=2.1, and $S_3/S_2$=2.1. Thus the agreement between the experimental and actual intensity ratios is closer for the phi data than for the theta values.

The peak of the derivative at an angle of 31° is 24 counts/s-deg. As described above, this derivative is a precursor of the transition and does not indicate a source location. FIG. 7 shows that the polarity of this precursor is negative whereas all the transitions, corresponding to the three experimental sources, have positive polarities. The derivative plots in FIGS. 6 and 8, respectively, show absolute values and consequently, the polarities are not indicated. Similar precursors for the other two sources can be seen in FIG. 7 but they are smaller. These signatures are proportional to the source intensities and are always opposite in polarity to the source transitions.

It can be concluded from these results that the present invention's angular time synchronized directional radiation sensor could be used to locate x-ray or gamma ray sources in space with intensities of a few photons/cm$^2$- s. The device of the present invention could be rugged, light, inexpensive, and relatively easy to construct and apply. The sensitivity of this sensor can be expressed as 6 counts/Cs photons/cm$^2$.

Figure 9:
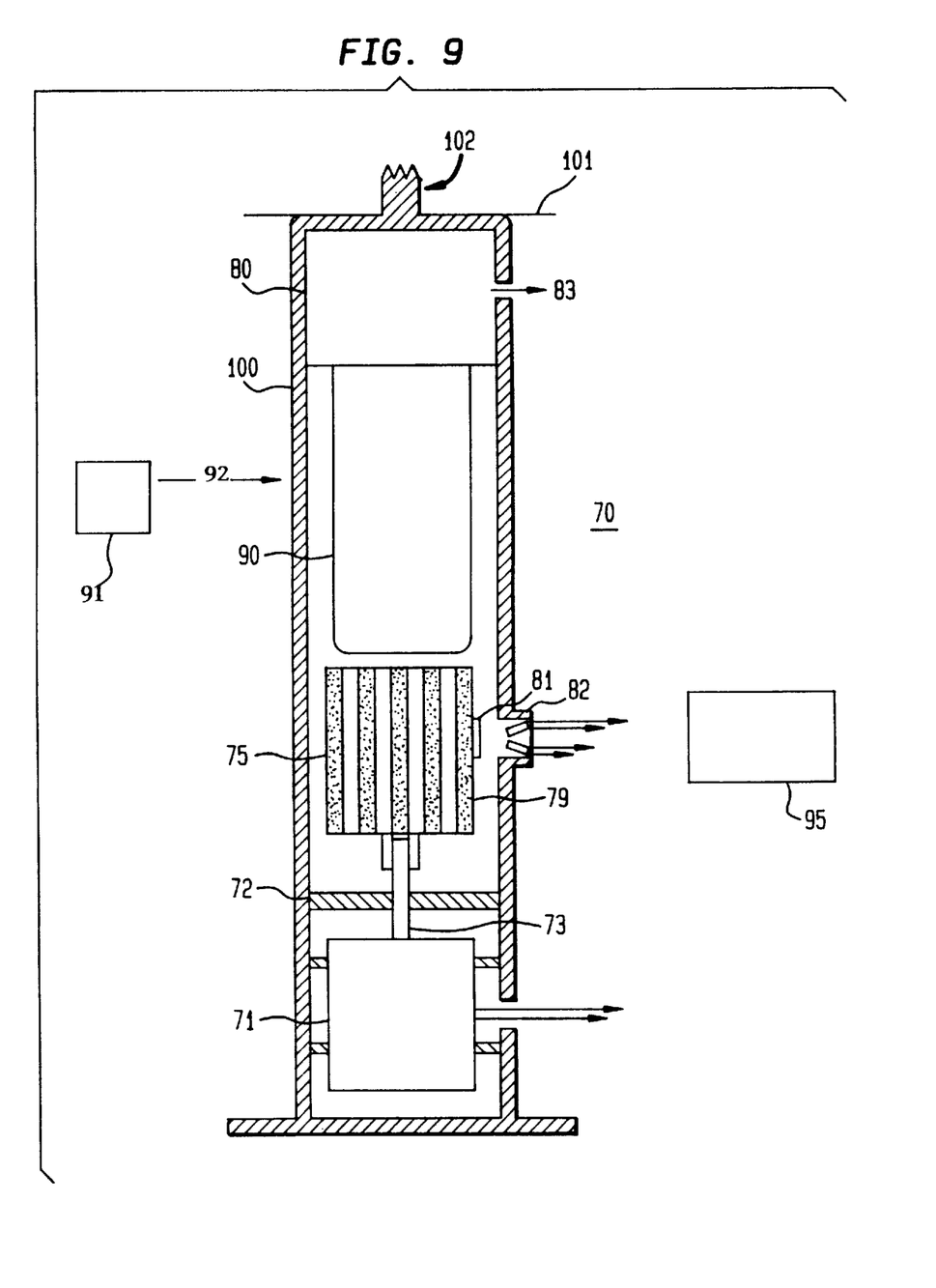
FIG. 9 is a conceptual cross sectional view of the preferred embodiment of the automated angular time-synchronized directional radiation sensor of the present invention having a computerized data collection capability.

Referring now to FIG. 9, there is depicted the preferred embodiment of the automated angular time-synchronized directional radiation sensor of the present invention. Sensor 70 is built with three main components: a means for radiation sensing 75, such as a scintillator counter, that interacts with incident radiation to produce light flashes that a photomultiplier tube ("PMT") 90 converts to electrical pulses, which are counted by a means for data collection 95. In this embodiment said data collection means 95 could be a computer. Said radiation sensing means 75 is rotatably mounted within a housing 100. Said radiation sensing means 75 is composed of numerous flat layers 76, each layer comprising a scintillator layer sandwiched between a foil layer and a Lucite™ layer, as depicted in FIG. 4 for the first embodiment. Said PMT 90, radiation sensing means 75, and a motor 71, are disposed in said light-tight housing 100. Disposed on the top outer surface of said housing 100 are a fixed protractor 101 and a rotatable gunsight 102 allowing for precise measurement of angles and distances. Said motor 71 is shielded by a light shield 72 to prevent light, such as from motor sparks, from reaching the PMT 90. Also depicted on the outer surface of said radiation sensing means 75 is a Lucite™ outer layer 79. A PMT socket and resistor stack 80 is disposed between said PMT 90 and the top portion of said housing 100. Said radiation-sensing means 75 can be composed of different combinations and numbers of layers, with different dimensions. All such variations are considered to be within the contemplation of the present invention. The radiation-sensing means 75 could also be a scintillator assembly, or another suitable radiation detection systems such as a stack of adequate solid state detectors, a suitable G.M counter, an ion chamber and so forth.

A mirror 81 is disposed on said outer layer 79 of the radiation sensing means 75. A means for receiving signals 82, having a timer, is disposed within said housing 100 in proximity to where said mirror 81 is located.

In operation, said radiation sensing means 75 rotates and said stationary PMT 90 interacts with a radiation source 91 emitting incident radiation, indicated by arrow 92, to produce light flashes. A shaft 73 projecting through said light shield 72 connects said radiation sensing means 75 to said synchronous motor 71. Said motor 71 causes said radiation sensing means 75 to rotate within said housing 100 so that a 360° scan is completed within 1 second. Said PMT 90 converts the light flashes from said radiation sensing means 75 into electrical pulses and provides a PMT output 83 from said PMT socket and resistor stack 80 to said data collection means 95. During each rotation of said radiation sensing means 75, said mirror 81, passing said stationary receiving means 82 within said housing 100, transmits a signal for each electrical pulse to said receiving means 82 to reset the timer after each rotation. This causes said receiving means 82 to record when each light flash was emitted. The timed electrical pulses that are then ultimately counted by said data collection means 95, thereby permitting the rapid measurements provided by this embodiment the present invention at a much-increased level of accuracy.

Whenever said mirror 81 passes and signals said receiving means 82, the timer is reset after each rotation. When an incident gamma ray produces a light flash in the radiation sensing means 75, the sensor 70 records the time, and thus the angle, at which the event occurred. Thus the time measured at any point during each rotation is proportional to the angle at the corresponding fraction of 360°. The timer of signal receiving means 82 could also be any electronic timing device.

By advantageous synchronization the angle of rotation of said radiation sensing means 75 with time as the sensor 70 accumulates counts or events the time needed to acquire the necessary data is reduced from several hours in the prior art devices to only a few minutes. The sensor 70 is turned on and exposed to the radiation for a time necessary to accumulate a statistically valid number of counts.

The data collection means 95 employed in this embodiment was a desk top personal computer having an EG & G multi channel scalar and software. Using such a computer, electronics devices and software permits more accurate and rapid measurement of electrical pulses, signals, distances and time so that measurements that used to require hours can be accomplished in minutes. To convert the number of counts or rate of counts versus angle, one should display the first derivative of that function as was shown in S. Kronenberg et al. "Locating and Imaging Sources of Gamma and X-radiation Directly or Through Thick Shields," cited above. The computer should be programmed to accomplish this calculation. In the preferred embodiment of the present invention, the data collection means can be a small palm-top computer with the appropriate software to provide an accurate clock and perform the data reduction.

Another demonstration of the increased sensitivity and rapid measurement capabilities of the preferred embodiment of the present invention, where the data collection means 95 was a computer having an EG & G Ortec multi channel scalar system, provided similarly greater capabilities than those afforded by prior art radiation sensors. The occasion for this demonstration was the removal of a radiation source from a pool of water.

Figure 10:
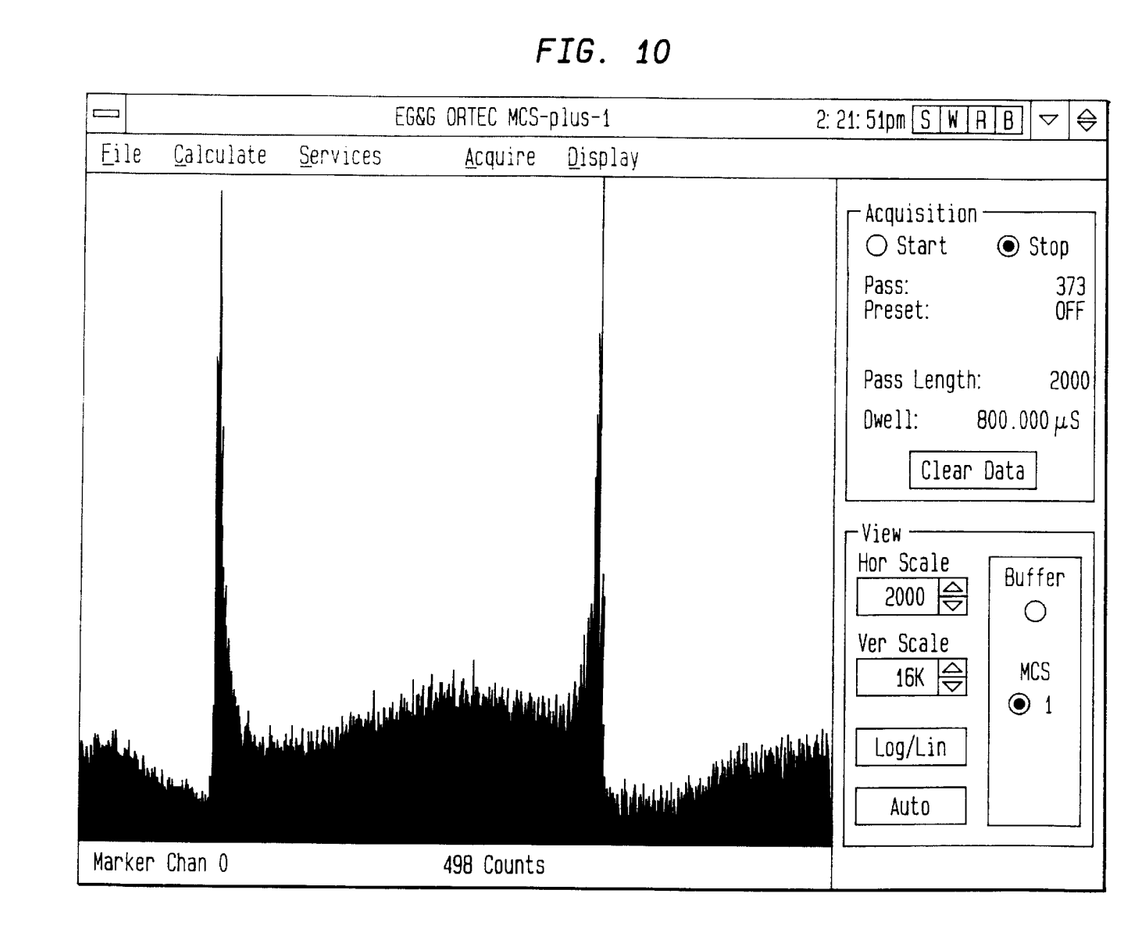
FIG. 10 is a graph of a point source scan of a radioactive source on a computer screen.

Referring now to FIG. 10, there is depicted a computer-generated chart of a point source scan of a $Co^{60}$ radioactive source, with the two peaks of the display representing the outer edges of the radiation source. It is also possible to display other computer-generated charts such as an x-ray scan of radioactive sources shown as a broad distributive radioactive source, also using the sensor 70 of the present invention with a computer having an EG & G Ortec multi channel scalar system. In this computer screen, the PMT was operated at 1,300 volts, and the device was deployed at a distance of 24 feet from the $S_1$ source, with $S_1$ measuring 24" in diameter. Already after the first scan of 1 second in duration, one can observe indications of the source's location. Subsequent scans improved the accuracy of the measurement.

The FIG. 10 chart was generated with the EG& G Ortec multi channel scalar. However, those skilled in the art will readily recognize that other computerized systems and software programs are equally well-suited for this data collection function, and neither this disclosure nor the appended claims are intended to be limited to those computers or programs. Similarly, the variations previously described in the first embodiment of the present invention may readily be incorporated into this preferred embodiment.

Those skilled in the art will readily recognize that there are several other potential applications of this sensor outside the field of gamma ray detection, to include astronomy, anti-nuclear proliferation and anti-terrorism.

It is to be further understood that other features and modifications to the foregoing detailed description are within the contemplation of the invention, which is not limited by this description. Those skilled in the art will readily appreciate that any number of configurations of angular time synchronized directional radiation sensors and numerous combinations of sensors, differing thicknesses and different combinations of materials, stacking arrangements, numbers of layers and different dimensions can achieve the results described herein. Accordingly, the present invention should not be limited by the foregoing description, but only by the appended claims.

What we claim is:

1. An angular time synchronized directional radiation sensor comprising:

a stationary photomultiplier tube connected to a radiation sensing means within a housing, said radiation sensing means, being separated from said photomultiplier tube by an air gap;

said radiation sensing means, rotating within said housing, said housing being exposed to a radiation source in an unknown location;

said radiation sensing means, having a means for transmitting signals disposed on an outer layer and an angle of rotation synchronized with time, performs a 360° scan of said radiation source;

said radiation sensing means, having a plurality of flat layers sensitive to said radiation source, emits a plurality of light flashes;

said photomultiplier tube converts said plurality of light flashes into a plurality of electrical pulses;

a receiving means, having a timer, is disposed within said housing in proximity to said transmitting means;

during each rotation of the radiation sensing means, said transmitting means, passing said receiving means, transmits a signal for each of said plurality of electrical pulses to said receiving means;

said receiving means resets said timer recording when each of said plurality of light flashes was emitted;

said receiving means provides a count output including a time of light flash input to a means for data collection, said time of light flash input indicating the angle where said radiation source is located; and based on said count output, said data collection means calculates said angle of rotation at a corresponding fraction of said 360° scan to rapidly indicate the direction of said radiation source.

2. The angular time synchronized directional radiation sensor, as recited in claim 1, further comprising:

said radiation sensing means being rotated by a shaft connected to a synchronous motor within said housing; and a light shield is disposed between said motor and said radiation sensing means.

3. The angular time synchronized directional radiation sensor, as recited in claim 2, wherein said housing is internally light-tight.

4. The angular time synchronized directional radiation sensor, as recited in claim 3, further comprising each one of said plurality of flat layers having a scintillator layer sandwiched between a foil layer and a Lucite layer.

5. The angular time synchronized directional radiation sensor, as recited in claim 4, further comprising:

said scintillator layer is constructed of plastic;

said foil layer is constructed of lead; and said outer layer is constructed of Lucite.

6. The angular time synchronized directional radiation sensor, as recited in claim 5, wherein:

said scintillator layer is 0.254 mm thick;

said foil layer is 0.127 mm thick;

said Lucite layer is 1.6 mm thick; and said outer layer is 3.2 mm thick.

7. The angular time synchronized directional radiation sensor, as recited in claim 6, further comprising said plurality of flat layers having at least 40 of said flat layers.

8. The angular time synchronized directional radiation sensor, as recited in claim 7, wherein said radiation sensing means is 8 cm×8 cm and is 12.7 cm high.

9. The angular time synchronized directional radiation sensor, as recited in claim 8, further comprising said 360° scan being completed in at least one second.

10. The angular time synchronized directional radiation sensor, as recited in claim 9, further comprising a sensitivity of 6 counts/Cs photons/cm$^2$.

11. The angular time synchronized directional radiation sensor, as recited in claim 10, further comprising:

said housing having a wall 0.27 mm thick; and said housing having a circular shape.

12. The angular time synchronized directional radiation sensor, as recited in claim 11, wherein said radiation sensing means is a scintillator assembly.

13. The angular time synchronized directional radiation sensor, as recited in claim 1, further comprising said timer being an electronic timing device.

14. The angular time synchronized directional radiation sensor, as recited in claim 1, further comprising said transmitting means having a magnet.

15. The angular time synchronized directional radiation sensor, as recited in claim 14, further comprising said receiving means having a coil responsive to said magnet.

16. The angular time synchronized directional radiation sensor, as recited in claim 1, further comprising said transmitting means having an infrared LED device.

17. The angular time synchronized directional radiation sensor, as recited in claim 16, further comprising said receiving means having an infrared sensor responsive to said an infrared LED device.

18. The angular time synchronized directional radiation sensor, as recited in claim 11, further comprising said data collection means being automated with a data processor.

19. The angular time synchronized directional radiation sensor, as recited in claim 11, further comprising said data collection means being automated with a computer.

20. An automated angular time synchronized directional radiation sensor, comprising:

a stationary photomultiplier tube connected to a radiation sensing means within a housing, said radiation sensing means, being separated from said photomultiplier tube by an air gap;

said radiation sensing means, rotating within said housing, said housing being exposed to a radiation source in an unknown location;

a PMT socket and resistor stack is disposed within an upper portion of said housing above said photomultiplier tube;

a fixed protractor and rotatable gunsight are disposed on top of said housing;

said radiation sensing means, having a mirror disposed on an outer layer and an angle of rotation synchronized with time, performs a 360° scan of said radiation source;

said radiation sensing means, having a plurality of flat layers sensitive to said radiation source, emits a plurality of light flashes;

said photomultiplier tube converts said light flashes into a plurality of electrical pulses and provides a PMT output from said PMT socket and resistor stack to a means for data collection;

a receiving means, having a timer, is disposed within said housing in proximity to said mirror;

during each rotation of the radiation sensing means, said mirror, passing said receiving means, transmits a signal for each of said plurality of electrical pulses to said receiving means;

said receiving means resets said timer recording when each of said light flashes was emitted;

said receiving means provides a count output including a time of light flash input to said data collection means, said time of light flash input indicating the angle where said radiation source is located; and based on said PMT output and said count output, said data collection means calculates said angle of rotation at a corresponding fraction of said 360° scan to rapidly indicate the direction of said radiation source.

21. The automated angular time synchronized directional radiation sensor, as recited in claim 20, further comprising:

said radiation sensing means being rotated by a shaft connected to a synchronous motor within said housing; and a light shield is disposed between said motor and said radiation sensing means.

22. The automated angular time synchronized directional radiation sensor, as recited in claim 21, wherein said housing is internally light-tight.

23. The automated angular time synchronized directional radiation sensor, as recited in claim 22, further comprising each one of said plurality of flat layers having a scintillator layer sandwiched between a foil layer and a Lucite layer.

24. The automated angular time synchronized directional radiation sensor, as recited in claim 23, further comprising:

said scintillator layer is constructed of plastic;

said foil layer is constructed of lead; and said outer layer is constructed of Lucite.

25. The automated angular time synchronized directional radiation sensor, as recited in claim 24, wherein:

said scintillator layer is 0.254 mm thick;

said foil layer is 0.127 mm thick;

said Lucite layer is 1.6 mm thick; and said outer layer is 3.2 mm thick.

26. The automated angular time synchronized directional radiation sensor, as recited in claim 25, further comprising said plurality of flat layers having at least 40 of said flat layers.

27. The automated angular time synchronized directional radiation sensor, as recited in claim 26, wherein said radiation sensing means is 8 cm×8 cm and is 12.7 cm high.

28. The automated angular time synchronized directional radiation sensor, as recited in claim 27, further comprising said 360° scan being completed in at least one second.

29. The automated angular time synchronized directional radiation sensor, as recited in claim 28, further comprising a sensitivity of 6 counts/Cs photons/cm$^2$.

30. The automated angular time synchronized directional radiation sensor, as recited in claim 29, further comprising:

said housing having a wall 0.27 mm thick; and said housing having a circular shape.

31. The automated angular time synchronized directional radiation sensor, as recited in claim 30, wherein said radiation sensing means is a scintillator assembly.

32. The automated angular time synchronized directional radiation sensor, as recited in claim 20, further comprising said timer being an electronic timing device.

33. The automated angular time synchronized directional radiation sensor, as recited in claim 30, further comprising said data collection means being a data processor.

34. The automated angular time synchronized directional radiation sensor, as recited in claim 30, further comprising said data collection means being a computer with a means for displaying data.

\* \* \* \* \*